UNITED STATES PATENT OFFICE.

MARTIN F. NEWMAN, OF OAKMONT, PENNSYLVANIA, ASSIGNOR TO WM. B. SCAIFE & SONS COMPANY, OF OAKMONT, PENNSYLVANIA, A CORPORATION OF PENNSYLVANIA.

PROCESS OF PURIFYING AND DECOLORIZING WATER.

1,418,013.     Specification of Letters Patent.     Patented May 30, 1922.

No Drawing.     Application filed September 5, 1919. Serial No. 321,860.

*To all whom it may concern:*

Be it known that I, MARTIN F. NEWMAN, a resident of Oakmont, in the county of Allegheny and State of Pennsylvania, have invented a new and useful Improvement in Processes of Purifying and Decolorizing Water, of which the following is a specification.

This invention relates to chemical treatment of water for the reduction of its color and also for its clarification.

Water from many sources is highly colored from various causes. The surface water in swampy districts and in semi-tropical countries is discolored from soil acids and vegetable extracts. The present invention contemplates the removal of the color from water to be used for drinking or other purposes.

In many cases where water is colored, if it be treated with alkalies, such as calcium carbonate, calcium hydroxide, or sodium carbonate, in connection with a coagulant, such as aluminum sulphate or ferrous sulphate, there follows an accentuation, rather than a reduction of the color.

The object of the present invention is to reduce the color of water and also to clarify it, by treating the water with an alkaline bleaching agent, or an alkali and a bleaching agent, following this by treating with a coagulant, and then with a reagent to remove any excess bleaching agent, and carrying out such treatment in a manner to clarify the water and to reduce its color.

In carrying out the process for clarifying water and reducing its color, the water is first treated with an alkaline bleaching agent, such as hypochlorite of lime or other alkaline materials yielding chlorine, to serve as the bleaching agent, or by treating the water with an alkali, such as calcium hydroxide or sodium carbonate, followed by an application of chlorine. In either case chlorine becomes available in the water and serves as the bleaching agent, and at the same time the water is rendered alkaline and is therefore in better condition to respond to the subsequent treatment with a coagulant, such as aluminum sulphate, for clarifying the water.

This coagulating agent is preferably introduced as the water flows into a sedimentation basin. After a sufficient period of sedimentation a reducing agent, preferably sodium thiosulphate, is added to free the water from any active chlorine by converting it into unobjectionable compounds. The water is then filtered. This completes the process and results in a potable water that is clear and in which the color has been greatly reduced.

In carrying out the process it is necessary to treat the water with the bleaching agent before it is treated with the coagulant. If these two steps are reversed the color is not reduced to the minimum. The reduction in color is, however, not effected until the coagulant is introduced. The coagulant has two functions in this process, first, it acts as a coagulant and, second, it produces an effect in combination with the previously introduced bleaching agent which it does not have alone. This sequence of treatments produces a hitherto unobtainable reduction in color for potable water, which is not obtainable with either agent singly or the two in the reversed sequence.

In the case of ferruginous waters, it is desirable to remove the ferrous compounds before subjecting the same to the treatment hereinbefore described, by first aerating the water to oxidize and precipitate the ferrous compounds.

Other reagents for effecting the various results above stated may obviously be used, but those specifically named have been found effective and are preferred.

I claim:

1. The process of treating water for clarification and the reduction of color due to soil acids, vegetable extracts or other causes, consisting in first treating the water with an alkali in connection with a bleaching agent, following this by treating the water with a coagulant, then treating the water with a reagent to remove any excess bleaching agent which may be present.

2. The process of treating water for clarification and the reduction of color due to soil acids, vegetable extracts or other causes, consisting in first treating the water with an alkali in connection with a bleaching agent, then treating the water with a coagulant, then treating the water with sodium thiosulphate to remove any excess bleaching agent present.

3. The process of treating water for clarification and the reduction of color due to soil acids, vegetable extracts or other causes, consisting in treating the water with an alkali in connection with chlorine, then treating the water with a coagulant, then treating the water with a reagent to remove any excess chlorine or chlorine yielding substances which may be present.

4. The process of treating water for clarification and the reduction of color due to soil acids, vegetable extracts or other causes, consisting in treating the water, with calcium hypochlorite, then treating it with a coagulant, then treating it with a reagent to remove any excess chlorine or chlorine yielding substances which may be present.

In testimony whereof, I have hereunto set my hand.

MARTIN F. NEWMAN.

Witnesses:
G. G. TRILL,
HOWARD L. SNIVELY.